United States Patent [19]
Pniel

[11] Patent Number: 6,048,172
[45] Date of Patent: Apr. 11, 2000

[54] AUTONOMOUS HELICOPTER BLADE END LIGHTING DEVICE

[75] Inventor: Zeev Pniel, Petah Tikva, Israel

[73] Assignee: International Technologies (Lasers) Ltd., Rishon Lezion, Israel

[21] Appl. No.: 09/035,891

[22] Filed: Mar. 6, 1998

[51] Int. Cl.[7] .............................. F01D 25/00; G08B 21/00
[52] U.S. Cl. ............................................... 416/5; 340/946
[58] Field of Search ..................... 416/5; 340/946

[56] References Cited

U.S. PATENT DOCUMENTS

| | | |
|---|---|---|
| 2,423,528 | 7/1947 | Stewart ..................................... 340/946 |
| 2,555,807 | 6/1951 | Morris ..................................... 244/58 X |
| 3,174,552 | 3/1965 | Soucy, Jr. .................................. 416/5 X |
| 3,395,875 | 8/1968 | Donovan .................................. 416/5 X |
| 3,710,311 | 1/1973 | Avital ....................................... 340/946 |
| 3,723,722 | 3/1973 | Van Iderstine et al. ............. 340/946 X |
| 3,846,023 | 11/1974 | Wilkin ....................................... 356/21 |
| 4,066,890 | 1/1978 | Hamilton et al. ................... 340/946 X |
| 4,916,581 | 4/1990 | Authier ............................... 340/946 X |
| 5,793,164 | 8/1998 | Authier ............................... 340/946 X |

*Primary Examiner*—John E. Ryznic
*Attorney, Agent, or Firm*—Mark M. Friedman

[57] ABSTRACT

An autonomous helicopter blade end lighting device including a light source being connectable to a helicopter blade end, and a power source being connectable to the helicopter blade end for providing the light source with power for operation.

135 Claims, 3 Drawing Sheets

AUTONOMOUS HELICOPTER BLADE END LIGHTING DEVICE

FIELD AND BACKGROUND OF THE INVENTION

The present invention relates to a lighting device and, more particularly, to an autonomous lighting device for helicopter blade end (tip).

A helicopter (chopper) is an aircraft that is lifted and sustained in the air horizontally by rotating wings or blades turning on vertical axes through power supplied by an engine.

Helicopters are used for civil, military and law enforcement applications. Some heavy helicopters are adapted to carry dozens of passengers (e.g., worriers) and their equipment.

In some cases, helicopters fly in a close formation which includes a pair or more of helicopters, under low visibility conditions (e.g., at a dark night), which increases the chances of a collision between closely navigating helicopters.

Indeed, in 1997, two Israeli helicopters of a pair formation crashed in the north of Israel due to collision therebetween causing the death of all 72 crew and passengers.

Helicopter blade end lighting systems are known for several years. Such systems include a light source which receives power from the main power source of the aircraft. These prior art systems are controlled by the pilot from the cockpit. As such, these systems are wired both to the cockpit and to the main power source via sliding contacts at the rotor's shaft.

However, in modern helicopters, such as, but not limited to, BLACKHAWK, COBRA, APACHE, wiring between the blades and the aircraft's body is not feasible, since in such helicopters the blades are each a bulk of composite material and has no inner cavity adapted for wiring, and further since such helicopters lack sliding contacts at the rotor's shaft.

There is thus a widely recognized need for, and it would be highly advantageous to have, an autonomous helicopter blade end lighting device.

SUMMARY OF THE INVENTION

According to the present invention there is provided an autonomous helicopter blade end lighting device.

According to further features in preferred embodiments of the invention described below, the device comprising a light source being connectable to a helicopter blade end, and a power source being connectable to the helicopter blade end for providing the light source with power for operation.

According to further features in preferred embodiments of the invention described below, provided is a method of lighting a helicopter blade end comprising the step of attaching an autonomous lighting device to the helicopter blade end, the autonomous lighting device including a light source being connectable to the helicopter blade end, and a power source being connectable to the helicopter blade end for providing the light source with power for operation.

According to still further features in the described preferred embodiments the device further comprising a housing connectable to the helicopter blade end, the housing holding the light source and the power source.

According to still further features in the described preferred embodiments the power source is a battery.

According to still further features in the described preferred embodiments the battery is oriented such that its pointed end faces away from the end of the blade.

According to still further features in the described preferred embodiments the battery provides at least three volts and at least 1500 milliampers·hour.

According to still further features in the described preferred embodiments the battery is a lithium battery.

According to still further features in the described preferred embodiments the battery is a lithium thionylchloride battery.

According to still further features in the described preferred embodiments the power source is a voltage generator (e.g., a dynamo).

According to still further features in the described preferred embodiments the voltage generator includes a wind operated turbine.

According to still further features in the described preferred embodiments the power source and the light source are resistible to g forces developing at the helicopter blade end when rotated.

According to still further features in the described preferred embodiments the power source and the light source are resistible to 1200 g force.

According to still further features in the described preferred embodiments the light source is an infrared light source.

According to still further features in the described preferred embodiments the infrared light source emits in a wavelength detectable by night vision systems.

According to still further features in the described preferred embodiments the infrared light source emits in a wavelength between 750 and 900 nm.

According to still further features in the described preferred embodiments the light source is detectable from 300 meters.

According to still further features in the described preferred embodiments the light source provides a beam of about 30° in vertical width.

According to still further features in the described preferred embodiments the light source is a semiconductor light source.

According to still further features in the described preferred embodiments the light source is a light emitting diode.

According to still further features in the described preferred embodiments the light emitting diode emits at 750–900 nm.

According to still further features in the described preferred embodiments the light source produces light intensity of at least one milliwat, preferably at least 20 milliwat.

According to still further features in the described preferred embodiments the device further comprising a background light sensor for limiting the operation of the light source to background light below a predetermined threshold.

According to still further features in the described preferred embodiments the background light sensor is resistible to g forces developing at the helicopter blade end when rotated.

According to still further features in the described preferred embodiments the background light sensor is a photoresistive sensor.

According to still further features in the described preferred embodiments the device further comprising a centrifugal switch for limiting the light source to operate only above a predetermined g force value.

According to still further features in the described preferred embodiments the predetermined g force value is 150–200 g.

According to still further features in the described preferred embodiments the device further comprising a magnetic field sensitive switch bypassing the centrifugal switch, magnetic field sensitive switch serves for conducting maintenance functionality tests of the light source.

According to still further features in the described preferred embodiments the housing includes a hardened molded substance for supporting and protecting the power source against g forces and vibrations.

According to still further features in the described preferred embodiments the device further comprising a second light source connectable to the helicopter blade end and receiving power from the power source, the light sources being arranged tail to tail.

According to still further features in the described preferred embodiments the device weights less than 100 grams.

The present invention successfully addresses the shortcomings of the presently known configurations by providing an autonomous, self powered, helicopter blade end lighting device which operates only when the rotor of the helicopter rotates in the dark. Additional preferred features and advantages of the lighting system according to the present invention will become apparent to one ordinarily skilled in the art from the following descriptions.

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1:
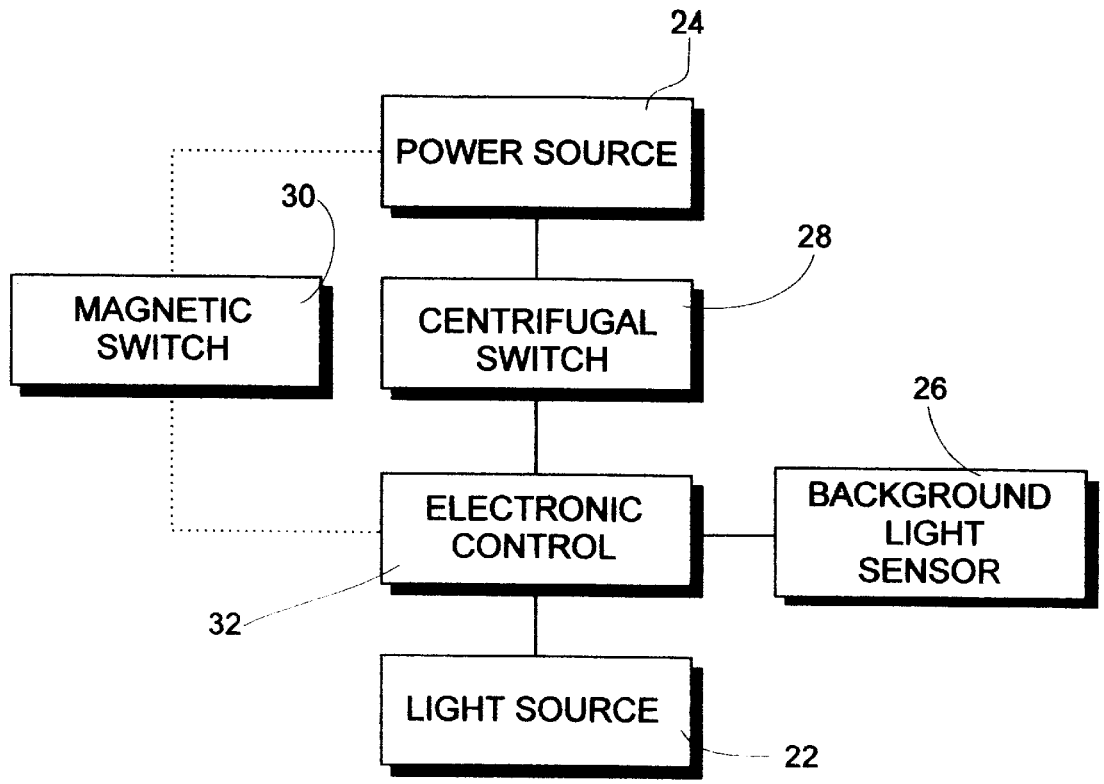
FIG. 1 is a block diagram describing the components of the autonomous lighting device for helicopter blade according to the present invention.

The present invention is of an autonomous lighting device for helicopter blade end which can be used to render the rotor of the helicopter detectable by a pilot of a second helicopter in a formation. Specifically, the present invention can be used to reduce the chances of a collision between helicopters flying in close formation.

The principles and operation of a lighting device according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
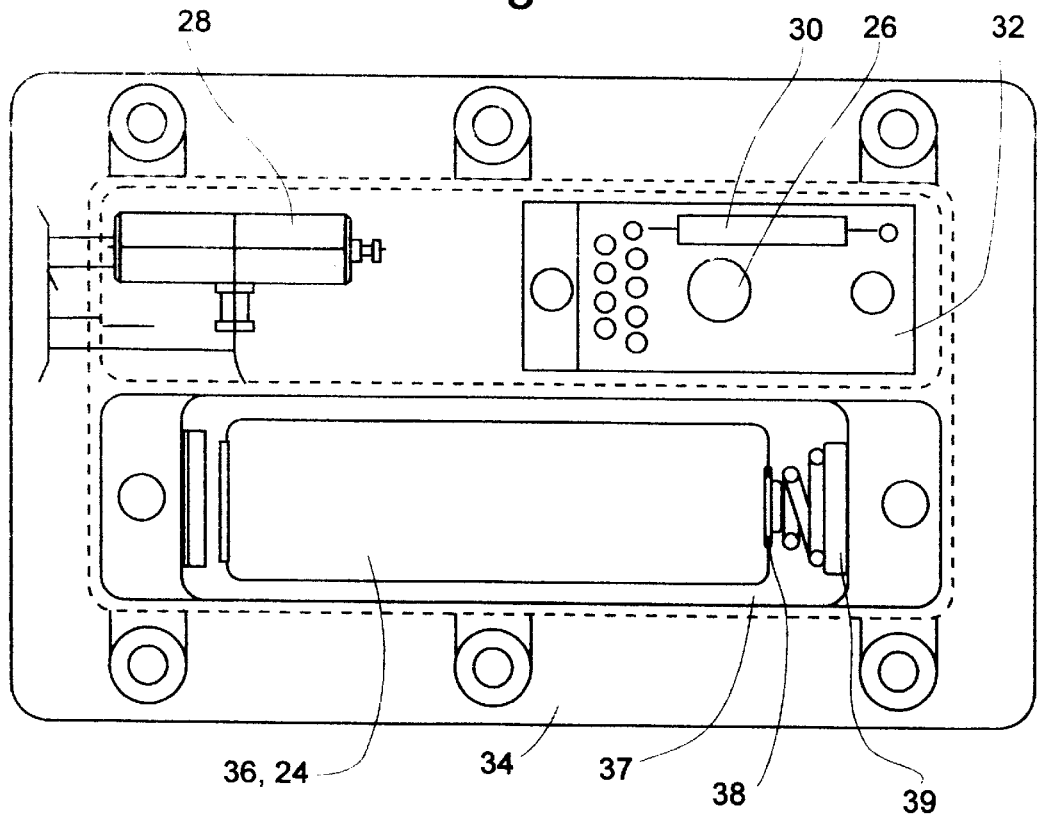
FIG. 2 is a top view of the autonomous lighting device according to the present invention.
Figure 3:
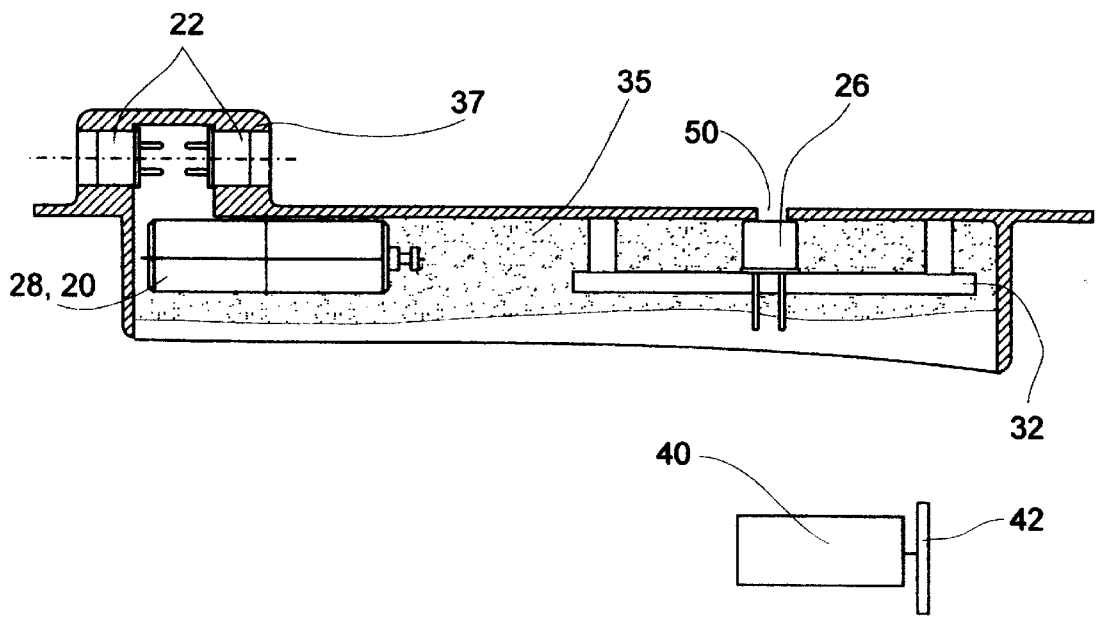
FIG. 3 is a cross sectional view of the autonomous lighting device according to the present invention.
Figure 4:
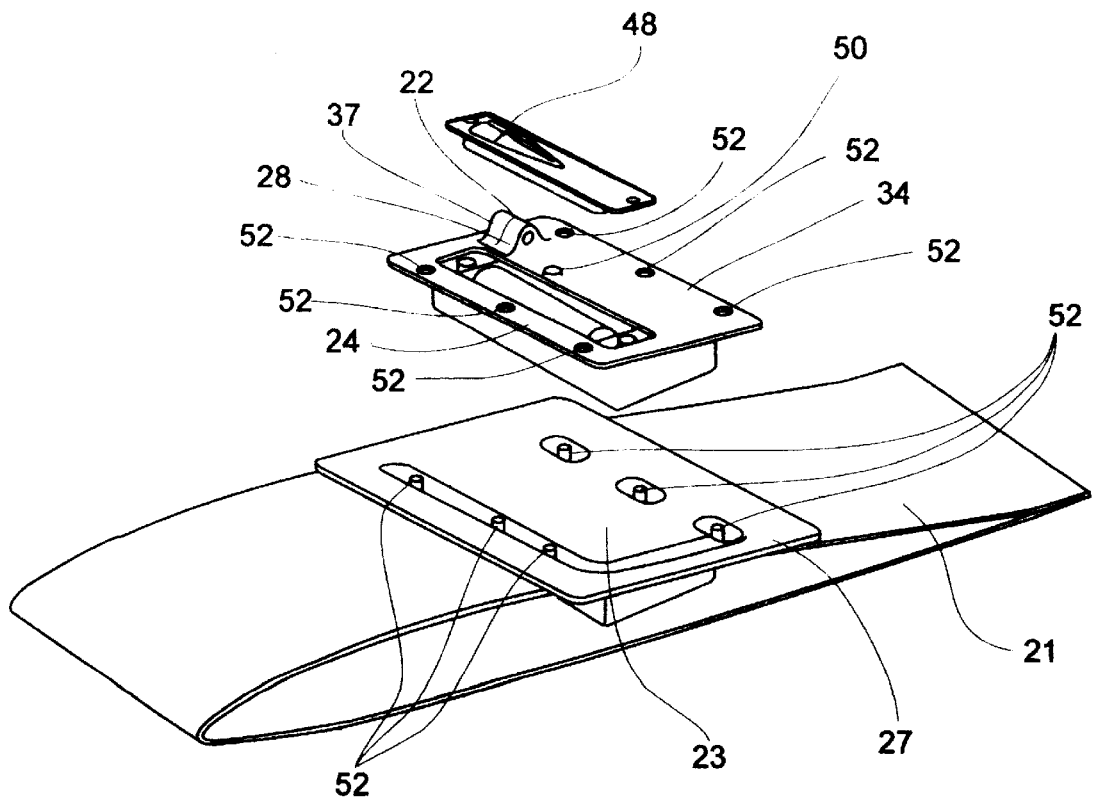
FIG. 4 is a perceptive view of the autonomous lighting device according to the present invention and of an end of a helicopter blade designed to accept the device.

Referring now to the drawings, FIG. 1 is a block diagram of the relations among the basic components of the lighting device according to the present invention. FIGS. 2–4 illustrate the basic components of the device according to the present invention, which is referred to hereinbelow as lighting device 20.

Thus, lighting device 20 includes a light source 22. Light source 22 is connectable (either directly or preferably indirectly via a housing as further detailed below) to a helicopter blade end or tip 21. Device 20 further includes a power source 24. Power source 24 is connectable (either directly or preferably indirectly via a housing as further detailed below) to the helicopter blade end 21 and provides light source 22 with power for its operation.

According to a preferred embodiment of the present invention lighting device 20 further includes a background light sensor 26. Sensor 26 serves for limiting the operation of light source 22 to background light below a predetermined threshold value, e.g., below 1–50 Lux (twilight equals about 10 Lux, deep twilight equals about 10 lux). As a result, source 22 operates only when required and power is saved.

Sensor 26 is preferably a photoresistive sensor, which therefore includes a resistor having resistivity which depends on light level to which it is exposed. A suitable sensor is distributed by EG&G (U.S.), Cat. No. VT20N. Sensor 26 is alternatively a photodiode, e.g., a P.I.N. photodiode.

According to another preferred embodiment of the present invention lighting device 20 further includes a centrifugal switch 28. Switch 28 serves for limiting light source 22 to operate only above a predetermined g force value, say 150–200 g. As a result, source 22 operates only when the motor of the helicopter rotates, typically upon flight, and power is saved.

Thus, when in combination, sensor 26 and switch 28 ensure that source 22 operates only when the motor of the helicopter is operated in the dark. A suitable centrifugal switch is distributed by Inertia (Switzerland), Cat. No. 6UO-200.

According to another preferred embodiment of the present invention lighting device 20 further includes a magnetic field sensitive switch 30. Switch 30 is implemented such that it bypasses centrifugal switch 28 and serves for conducting maintenance functionality tests of light source 26. Closing switch 30 is effected by providing a magnet in its proximity. A suitable magnetic field sensitive switch is the REED SWITCH which is distributed by Philips, Cat. No. RI-23AAA.

According to yet another preferred embodiment of the present invention lighting device 20 further includes an electronic control card 32, i.e., a P.C. board. Card 32 electronically communicates with the other components of device 20, ensuring their operation as herein described. A suitable card is distributed by International Technologies (Lasers) Ltd. (Israel) Cat. No. ITL473100100.

According to a preferred embodiment of the present invention power source 24 is a battery 36. Battery 36 is preferably oriented such that its pointed end 38 (as opposed to the flat end), which seals battery 36 during its manufacture, faces away from end 21 of the helicopter blade when assembled therein, such that g forces acting on the electrolyte within battery 36 will force the electrolyte away from pointed end 38, to prevent leakage therefrom of the electrolyte.

Battery 36 is preferably engaged within a battery housing 37 which includes a spring 39 positioned away from blade end 21, such that it serves to maintain the contacts of battery 36 with housing 37 even under the high g forces developing. Thus, in sharp distinction from prior art battery housing wherein the spring engages the flat end of the battery, according to the present invention the spring engaged the pointed end of the battery.

According to a prefered embodiment of the present invention battery 36 provides at least three volts (e.g., 3.6 volts) and at least 1500 milliampers·hour. Battery 36 is preferably a lithium battery, most preferably a lithium thionylchloride battery. A suitable battery is a lithium 3.6 V AA battery, distributed by SAFT (France), Cat. No. LS14500, having a total weight of 15 grams. This battery is adapted to perform under a wide temperature range (−50° C. to +80° C.).

According to an alternative embodiment of the present invention power source 24 is a voltage generator (e.g., dynamo) 40 (shown in FIG. 7), e.g., capable of transforming mechanical energy into electrical energy. A suitable voltage generator, for example, includes a wind operated turbine 42, which is rotated by wind associated with the rotational rotor action and/or vectorial flight itself. Alternatively, voltage generator 40 includes a vibrateable magnetic element. One ordinarily skilled in the art would know how to devise and implement voltage generator 40 within device 20.

According to a preferred embodiment of the invention light source 22 is an infrared light source, which emits in a wavelength detectable by night vision systems, e.g., in the near infrared spectral range, say between 750 and 900 nm, preferably 830 nm.

An infrared light source is the preferred embodiment for military applications, wherein helicopters flying at night are preferably darkened, such that they are harder to detect and target. However, as the scope of the present invention is not limited to military applications, the light source may also emit in the visible spectral range (e.g., yellow or red light).

According to a prefered embodiment light source 22 is detectable from 300 meters, either to the naked eye or when assisted with night vision systems (e.g., AN/AVS-6—aviator night vision system, Litton, ITT defense (U.S.).

Light source 24 is preferably selected and/or implemented such that it provides a vertical lighting angle α of, say about 30°, preferably between 0° and 30°, wherein 0° is defined as the rotation plane of the helicopter blades. Light source 24 is preferably further selected and/or implemented such that it a horizontal lighting angle β, which is wide enough to generate a ring of light when the blades are at maximal speed, e.g., 60° (see FIG. 5).

Light source 24 is preferably a semiconductor light source, most preferably a light emitting diode (LED), which produces light intensity of at least one milliwat, preferably at least 20, 30 or 40 milliwat. Suitable LEDs are distributed by Hitachi (Japan), Cat. No. HLP 20RG or 30RG or 40RG or Model C, 830 nm.

Especially for military applications, light source 22 is preferably deployed such that it emits light upwardly and sideways, such that it is not vieable from the ground.

As shown in FIG. 3, a second light source 22 connectable to helicopter blade end 21 and receiving power from power source 24 may be employed in a head to tail configuration with the first light source 22, such that device 20 is better viewable by other aircrafts. Another option to achieve substantially the same effect is to equip blade end 21 with a reflective surface positioned to reflect some of the light radiation emitted from a single light source in directions from which it is not directly perceived at any given moment.

In any case, both power source 24 and light source 22, and in that respect all of the other components of device 20 as herein described, are selected resistible to g forces developing at helicopter blade end 21 when rotated at maximal speed, e.g., 1200 g force.

According to another preferred embodiment of the present invention lighting device 20 further includes a housing 34. Housing 34 is connectable to helicopter blade end 21 and serves for holding light source 22, power source 24 and other components of device 20, as applicable.

Housing 34 preferably includes a cover 48 removably attachable thereto, such that access to power source 24 is allowed, e.g., for easy replacement of source 24 when exhausted.

According to a preferred embodiment of the present invention housing 34 is filled with a hardened molded substance 35 (see FIG. 3). Substance 35 serves for supporting and protecting power source 24 and other components within housing 34 against g forces and vibrations associated with helicopter rotor operation.

Housing 34 is formed with an opening 50 positioned above sensor 26 for allowing sensor 26 to sense the level of background light radiation.

Housing 34 is preferably formed with a special protruding habitat 37 which serves for holding and securing light source 22, such that when device 20 is implemented over blade end 21, source 22 is elevated and therefore rendered more detectable by other aircrafts.

As shown in FIG. 4, housing 34 is shaped and designed acceptable by a recession 23 formed in blade end 21, such that the level to which device 20 protrudes from the surface of the blade is minimized, so that the aerodynamic properties of the blade are affected to a minimum degree as possible.

Both housing 34 and the blade are provided with screw holes 52 to assist in screwing device 20 and the blade together. Further attachments may, for example, include adhesives resistible to the g forces developing upon rotor rotation. Examples include, but are not limited to, LOCTITE by Loctite Inc. U.S.

According to a preferred embodiment recession 23 is formed in a cover element 27 which is designed to replace a conventional cover (not shown) of the weights housing typically deployed in helicopter blade ends.

According to a preferred embodiment of the present invention the overall weight of device 20 is selected low, e.g., about or below 100±1 grams, such that the functionality of the blade will be minorly affected.

Figure 5:
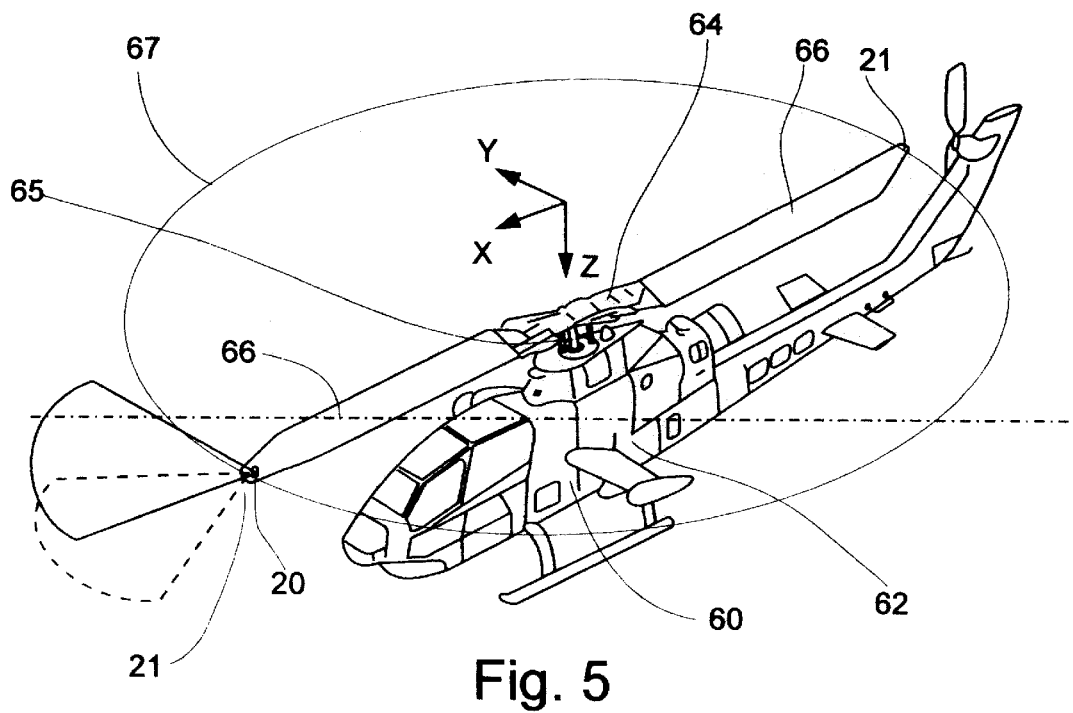
FIG. 5 is a perspective view of a helicopter supplemented with the autonomous lighting device according to the present invention and serves to demonstrate preferred lighting effects.

FIG. 5 shows a helicopter 60 having a body 62 and a rotor 64 connected via a shaft 65 on top thereto. Rotor 64 includes two blades 66, one of which is equipped with lighting device 20.

When rotor 64 rotates, the lighting effect is of a light ring 67 having a radius which is dictated by the distance in which device 20 is implemented with respect to rotor axes 65. When angles α and β are selected as described above, light ring 67 is undetectable from the ground.

Figure 6:
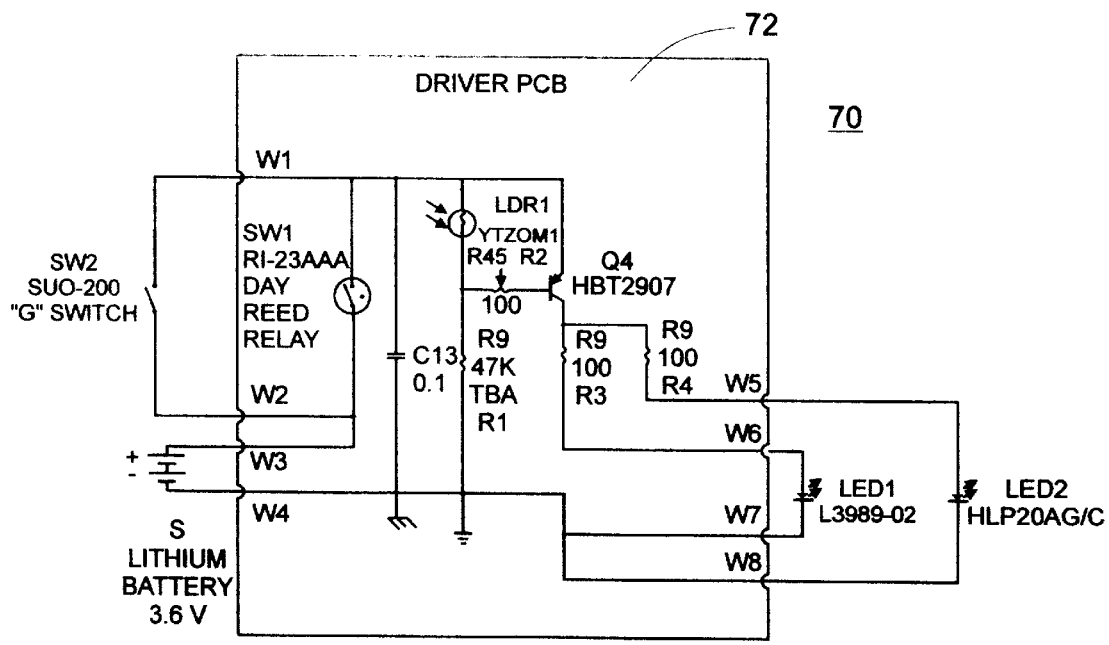
FIG. 6 is a schematic depiction of an electrical circuit of the autonomous lighting device according to the present invention.

FIG. 6 shows an electric circuit 70 which is suitable for device 20 as described herein with respect to its preferred embodiments.

Circuit 70 includes a printed circuit board (PCB) driver, wherein W1 to W8 are connection terminals. Circuit 70 includes a power source S which is preferably a lithium battery of 3.6 volts, a centrifugal switch (marked as SW2 or "G" switch), one or two light emitting diodes (LED1 and LED2), a magnetic field sensitive switch marked as SW1, photoresistive sensor marked as LDR1 and a transistor Q4 which functions as a current switch.

The negative pole (−) of lithium battery S is connected to circuit 70 via connection W4, which serves as a common ground for circuit 70. The positive pole (+) of lithium battery S is connected via terminal W3 to switch SW2 and switch SW1 which are parallel connected normally open switches. When either of switches SW2 or SW1 is closed, current is able to be drawn by consumers LED1 and/or LED2 of circuit 70.

Capacitor C13 functions as a high frequency filter to protect circuit 70 from electrical spikes that may cause improper operation and/or damage.

Transistor Q4, sensor LDR1 and resistor R1 are functioning as a current switch which is sensitive to an ambient light. When sensor LDR1 is exposed to light, its resistance drops and as a result transistor Q4 cannot supply LED1 and/or LED2 with current. Resistors R3 and R4 serve for current adjustment for the operation of LED1 and/or LED2. It is clear that circuit 70 is not intended to be limiting, rather to serve as a simple example.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An autonomous helicopter blade end lighting device comprising a light source being connectable to a helicopter blade end, and a power source being connectable to said helicopter blade end for providing said light source with power for operation, wherein said power source is a battery oriented such that its pointed end faces away from said end of said blade.

2. The lighting device of claim 1, further comprising a housing connectable to said helicopter blade end, said housing holding said light source and said power source.

3. The lighting device of claim 1, wherein said battery provides at least three volts and at least 1500 milliampers·hour.

4. The lighting device of claim 1, wherein said battery is a lithium battery.

5. The lighting device of claim 1, wherein said battery is a lithium thionylchloride battery.

6. The lighting device of claim 1, wherein said power source and said light source are resistible to g forces developing at said helicopter blade end when rotated.

7. The lighting device of claim 6, wherein said power source and said light source are resistible to 1200 g force.

8. The lighting device of claim 1, wherein said light source is an infrared light source.

9. The lighting device of claim 8, wherein said infrared light source emits in a wavelength detectable by night vision systems.

10. The lighting device of claim 8, wherein said infrared light source emits in a wavelength between 750 and 900 nm.

11. The lighting device of claim 1, wherein said light source is detectable from 300 meters.

12. The lighting device of claim 1, wherein said light source provides a beam of about 30° in vertical width.

13. The lighting device of claim 1, wherein said light source is a semiconductor light source.

14. The lighting device of claim 1, wherein said light source is a light emitting diode.

15. The lighting device of claim 14, wherein said light emitting diode emits at 750–900 nm.

16. The lighting device of claim 1, wherein said light source produces light intensity of at least one milliwat.

17. The lighting device of claim 1, further comprising a background light sensor for limiting the operation of said light source to background light below a predetermined threshold.

18. The lighting device of claim 17, wherein said background light sensor is resistible to g forces developing at said helicopter blade end when rotated.

19. The lighting device of claim 17, wherein said background light sensor is a photoresistive sensor.

20. The lighting device of claim 1, further comprising a centrifugal switch for limiting said light source to operate only above a predetermined g force value.

21. The lighting device of claim 20, wherein said predetermined g force value is 150–200 g.

22. The lighting device of claim 20, further comprising a magnetic field sensitive switch bypassing said centrifugal switch, magnetic field sensitive switch serves for conducting maintenance functionality tests of said light source.

23. The lighting device of claim 2, wherein said housing includes a hardened molded substance for supporting and protecting said power source against g forces and vibrations.

24. The lighting device of claim 1, further comprising a second light source connectable to said helicopter blade end and receiving power from said power source, said light sources being arranged tail to tail.

25. The lighting device of claim 1 weighting less than 100 grams.

26. An autonomous helicopter blade end lighting device comprising a light source being connectable to a helicopter blade end, and a power source being connectable to said helicopter blade end for providing said light source with power for operation, wherein said light source is a semiconductor light source.

27. The lighting device of claim 26, further comprising a housing connectable to said helicopter blade end, said housing holding said light source and said power source.

28. The lighting device of claim 26, wherein said power source is a battery.

29. The lighting device of claim 28, wherein said battery is oriented such that its pointed end faces away from said end of said blade.

30. The lighting device of claim 28, wherein said battery provides at least three volts and at least 1500 milliampers·hour.

31. The lighting device of claim 28, wherein said battery is a lithium battery.

32. The lighting device of claim 28, wherein said battery is a lithium thionylchloride battery.

33. The lighting device of claim 26, wherein said power source is a voltage generator.

34. The lighting device of claim 33, wherein said voltage generator includes a wind operated turbine.

35. The lighting device of claim 26, wherein said power source and said light source are resistible to g forces developing at said helicopter blade end when rotated.

36. The lighting device of claim 35, wherein said power source and said light source are resistible to 1200 g force.

37. The lighting device of claim 26, wherein said light source is an infrared light source.

38. The lighting device of claim 37, wherein said infrared light source emits in a wavelength detectable by night vision systems.

39. The lighting device of claim 37, wherein said infrared light source emits in a wavelength between 750 and 900 nm.

40. The lighting device of claim 26, wherein said light source is detectable from 300 meters.

41. The lighting device of claim 26, wherein said light source provides a beam of about 30° in vertical width.

42. The lighting device of claim 26, wherein said light source produces light intensity of at least one milliwat.

43. The lighting device of claim 26, further comprising a background light sensor for limiting the operation of said light source to background light below a predetermined threshold.

44. The lighting device of claim 43, wherein said background light sensor is resistible to g forces developing at said helicopter blade end when rotated.

45. The lighting device of claim 43, wherein said background light sensor is a photoresistive sensor.

46. The lighting device of claim 26, further comprising a centrifugal switch for limiting said light source to operate only above a predetermined g force value.

47. The lighting device of claim 46, wherein said predetermined g force value is 150–200 g.

48. The lighting device of claim 46, further comprising a magnetic field sensitive switch bypassing said centrifugal switch, magnetic field sensitive switch serves for conducting maintenance functionality tests of said light source.

49. The lighting device of claim 27, wherein said housing includes a hardened molded substance for supporting and protecting said power source against g forces and vibrations.

50. The lighting device of claim 26, further comprising a second light source connectable to said helicopter blade end and receiving power from said power source, said light sources being arranged tail to tail.

51. The lighting device of claim 26 weighting less than 100 grams.

52. An autonomous helicopter blade end lighting device comprising a light source being connectable to a helicopter blade end, a power source being connectable to said helicopter blade end for providing said light source with power for operation and a background light sensor for limiting the operation of said light source to background light below a predetermined threshold.

53. The lighting device of claim 52, further comprising a housing connectable to said helicopter blade end, said housing holding said light source and said power source.

54. The lighting device of claim 52, wherein said power source is a battery.

55. The lighting device of claim 54, wherein said battery is oriented such that its pointed end faces away from said end of said blade.

56. The lighting device of claim 54, wherein said battery provides at least three volts and at least 1500 milliampers·hour.

57. The lighting device of claim 54, wherein said battery is a lithium battery.

58. The lighting device of claim 54, wherein said battery is a lithium thionylchloride battery.

59. The lighting device of claim 52, wherein said power source is a voltage generator.

60. The lighting device of claim 59, wherein said voltage generator includes a wind operated turbine.

61. The lighting device of claim 52, wherein said power source and said light source are resistible to g forces developing at said helicopter blade end when rotated.

62. The lighting device of claim 61, wherein said power source and said light source are resistible to 1200 g force.

63. The lighting device of claim 52, wherein said light source is an infrared light source.

64. The lighting device of claim 63, wherein said infrared light source emits in a wavelength detectable by night vision systems.

65. The lighting device of claim 63, wherein said infrared light source emits in a wavelength between 750 and 900 nm.

66. The lighting device of claim 52, wherein said light source is detectable from 300 meters.

67. The lighting device of claim 52, wherein said light source provides a beam of about 30° in vertical width.

68. The lighting device of claim 52, wherein said light source is a semiconductor light source.

69. The lighting device of claim 52, wherein said light source is a light emitting diode.

70. The lighting device of claim 69, wherein said light emitting diode emits at 750–900 nm.

71. The lighting device of claim 52, wherein said light source produces light intensity of at least one milliwat.

72. The lighting device of claim 52, wherein said background light sensor is resistible to g forces developing at said helicopter blade end when rotated.

73. The lighting device of claim 52, wherein said background light sensor is a photoresistive sensor.

74. The lighting device of claim 52, further comprising a centrifugal switch for limiting said light source to operate only above a predetermined g force value.

75. The lighting device of claim 74, wherein said predetermined g force value is 150–200 g.

76. The lighting device of claim 74, further comprising a magnetic field sensitive switch bypassing said centrifugal switch, magnetic field sensitive switch serves for conducting maintenance functionality tests of said light source.

77. The lighting device of claim 53, wherein said housing includes a hardened molded substance for supporting and protecting said power source against g forces and vibrations.

78. The lighting device of claim 52, further comprising a second light source connectable to said helicopter blade end and receiving power from said power source, said light sources being arranged tail to tail.

79. The lighting device of claim 52 weighting less than 100 grams.

80. An autonomous helicopter blade end lighting device comprising a light source being connectable to a helicopter blade end, a power source being connectable to said helicopter blade end for providing said light source with power for operation and a centrifugal switch for limiting said light source to operate only above a predetermined g force value.

81. The lighting device of claim 80, further comprising a housing connectable to said helicopter blade end, said housing holding said light source and said power source.

82. The lighting device of claim 80, wherein said power source is a battery.

83. The lighting device of claim 82, wherein said battery is oriented such that its pointed end faces away from said end of said blade.

84. The lighting device of claim 82, wherein said battery provides at least three volts and at least 1500 milliampers·hour.

85. The lighting device of claim 82, wherein said battery is a lithium battery.

86. The lighting device of claim 82, wherein said battery is a lithium thionylchloride battery.

87. The lighting device of claim 80, wherein said power source is a voltage generator.

88. The lighting device of claim 87, wherein said voltage generator includes a wind operated turbine.

89. The lighting device of claim 80, wherein said power source and said light source are resistible to g forces developing at said helicopter blade end when rotated.

90. The lighting device of claim 89, wherein said power source and said light source are resistible to 1200 g force.

91. The lighting device of claim 80, wherein said light source is an infrared light source.

92. The lighting device of claim 91, wherein said infrared light source emits in a wavelength detectable by night vision systems.

93. The lighting device of claim 91, wherein said infrared light source emits in a wavelength between 750 and 900 nm.

94. The lighting device of claim 80, wherein said light source is detectable from 300 meters.

95. The lighting device of claim 80, wherein said light source provides a beam of about 30° in vertical width.

96. The lighting device of claim 80, wherein said light source is a semiconductor light source.

97. The lighting device of claim 80, wherein said light source is a light emitting diode.

98. The lighting device of claim 97, wherein said light emitting diode emits at 750–900 nm.

99. The lighting device of claim 80, wherein said light source produces light intensity of at least one milliwat.

100. The lighting device of claim 80, further comprising a background light sensor for limiting the operation of said light source to background light below a predetermined threshold.

101. The lighting device of claim 100, wherein said background light sensor is resistible to g forces developing at said helicopter blade end when rotated.

102. The lighting device of claim 100, wherein said background light sensor is a photoresistive sensor.

103. The lighting device of claim 80, wherein said predetermined g force value is 150–200 g.

104. The lighting device of claim 80, further comprising a magnetic field sensitive switch bypassing said centrifugal switch, magnetic field sensitive switch serves for conducting maintenance functionality tests of said light source.

105. The lighting device of claim 81, wherein said housing includes a hardened molded substance for supporting and protecting said power source against g forces and vibrations.

106. The lighting device of claim 80, further comprising a second light source connectable to said helicopter blade end and receiving power from said power source, said light sources being arranged tail to tail.

107. The lighting device of claim 80 weighting less than 100 grams.

108. An autonomous helicopter blade end lighting device comprising a light source being connectable to a helicopter blade end, a power source being connectable to said helicopter blade end for providing said light source with power for operation and a second light source connectable to said helicopter blade end and receiving power from said power source, said light sources being arranged tail to tail.

109. The lighting device of claim 108, further comprising a housing connectable to said helicopter blade end, said housing holding said light source and said power source.

110. The lighting device of claim 108, wherein said power source is a battery.

111. The lighting device of claim 110, wherein said battery is oriented such that its pointed end faces away from said end of said blade.

112. The lighting device of claim 110, wherein said battery provides at least three volts and at least 1500 milliampers·hour.

113. The lighting device of claim 110, wherein said battery is a lithium battery.

114. The lighting device of claim 110, wherein said battery is a lithium thionylchloride battery.

115. The lighting device of claim 108, wherein said power source is a voltage generator.

116. The lighting device of claim 115, wherein said voltage generator includes a wind operated turbine.

117. The lighting device of claim 108, wherein said power source and said light source are resistible to g forces developing at said helicopter blade end when rotated.

118. The lighting device of claim 117, wherein said power source and said light source are resistible to 1200 g force.

119. The lighting device of claim 98, wherein said light source is an infrared light source.

120. The lighting device of claim 119, wherein said infrared light source emits in a wavelength detectable by night vision systems.

121. The lighting device of claim 119, wherein said infrared light source emits in a wavelength between 750 and 900 nm.

122. The lighting device of claim 108, wherein said light source is detectable from 300 meters.

123. The lighting device of claim 108, wherein said light source provides a beam of about 30° in vertical width.

124. The lighting device of claim 98, wherein said light source is a semiconductor light source.

125. The lighting device of claim 98, wherein said light source is a light emitting diode.

126. The lighting device of claim 125, wherein said light emitting diode emits at 750–900 nm.

127. The lighting device of claim 98, wherein said light source produces light intensity of at least one milliwat.

128. The lighting device of claim 98, further comprising a background light sensor for limiting the operation of said light source to background light below a predetermined threshold.

129. The lighting device of claim 128, wherein said background light sensor is resistible to g forces developing at said helicopter blade end when rotated.

130. The lighting device of claim 128, wherein said background light sensor is a photoresistive sensor.

131. The lighting device of claim 98, further comprising a centrifugal switch for limiting said light source to operate only above a predetermined g force value.

132. The lighting device of claim 131, wherein said predetermined g force value is 150–200 g.

133. The lighting device of claim 131, further comprising a magnetic field sensitive switch bypassing said centrifugal switch, magnetic field sensitive switch serves for conducting maintenance functionality tests of said light source.

134. The lighting device of claim 99, wherein said housing includes a hardened molded substance for supporting and protecting said power source against g forces and vibrations.

135. The lighting device of claim 98 weighting less than 100 grams.

* * * * *